United States Patent

[11] 3,613,992

[72] Inventor Robert G. Knollenberg
   Mattoon, Ill.
[21] Appl. No. 538,904
[22] Filed Mar. 25, 1966
[45] Patented Oct. 19, 1971
[73] Assignee The United States of America as represented by the Director of the National Science Foundation

[54] WEATHER MODIFICATION METHOD
   18 Claims, No Drawings
[52] U.S. Cl. .................................................... 239/2,
   239/14, 252/359.1
[51] Int. Cl. ...................................................... A01g 15/00
[50] Field of Search ............................................ 239/2, 14;
   252/359.1, 305; 62/58

[56] References Cited
   UNITED STATES PATENTS
   2,232,728  2/1941  Pleasants ........................ 239/2
   2,527,230  10/1950 Schaefer ........................ 239/2
   2,550,324  4/1951  Brandau ........................ 239/2

OTHER REFERENCES

" On the Crystallization of Supercooled Clouds" C. L. Hosler, Journal of Meteorology Vol. 8, p. 326– 331, Oct. 1951

Primary Examiner—M. Henson Wood, Jr.
Assistant Examiner—Michael Y. Mar
Attorneys—T. Hayward Brown and Thomas J. Byrnes ABSTRACT: The present invention provides a method for producing rain or snow from natural atmospheric clouds using seeding agents characterized by a high solubility in water and a large endothermic heat of solution in water. Typical examples of materials suitable for use in practicing this invention are urea, potassium nitrate, potassium nitrite, and ammonium nitrate. Laboratory experiments have shown urea to be effective in producing ice crystals in a vapor cloud having a temperature as high as +6° C. In field experiments, urea has been observed to cause snow showers in supercooled clouds.

WEATHER MODIFICATION METHOD

The invention described herein may be manufactured and used by or for the Government of the United States of America for Governmental purposes without the payment of any royalties thereon or therefor.

The present invention relates to weather modification and more particularly to the production of rain or snow by introducing into natural atmospheric clouds seeding agents having a high solubility in water and a large endothermic heat of solution in water.

Precipitation in the form of rain or snow begins with the formation of clouds by the condensation of water vapor into small stable droplets, and in order for water vapor to condense, condensation nuclei must be present in the atmosphere. These nuclei are composed of sea salt, sulphates, or soil debris, and the smallest are commonly called Aitken nuclei. According to the widely accepted Bergeron theory, rain or snow is precipitated from a cloud when the particles are formed in the cloud. Ice particles, because of favorable equilibrium conditions, can increase in size at the expense of liquid water droplets, and as the ice particles increase in size, a point is reached at which they become heavy enough to fall to the ground. The formation of ice particles in clouds requires the presence of ice nuclei; however, the source of natural ice nuclei is presently unknown.

The artificial production of rain or snow has consisted mainly of attempts to initiate the formation of ice particles in natural atmospheric clouds. In general, two approaches have been used previous to the present invention. In the first, foreign material having a hexagonal crystalline structure similar to ice is introduced into clouds in order to stimulate by an epitaxial mechanism to growth to ice crystals within the clouds. Epitaxial ice crystal growth occurs by the accretion of water molecules on a seed crystal with a matching lattice structure and similar molecular distances. Typical of materials capable of acting as an ice nucleus in this manner are silver iodide, lead iodide, cupric sulfide, and kaolinite. Silver iodide has been the most widely used artificial seeding nucleus because of its high threshold temperature. The threshold temperature is the highest temperature at which a seeding agent is effective in producing ice crystals in a cloud of water droplets. The second approach has been to drastically supercool a local area of the cloud, thereby causing homogeneous ice nucleation in the cloud. A typical material employed in this manner is solid carbon dioxide or "Dry Ice."

Although these approaches have proved useful, they have not been entirely satisfactory under all conditions. Silver iodide is expensive and requires special generating equipment; further, it tends to decompose after a short exposure to the atmosphere. Lead iodide, cupric sulfide and kaolinite are characterized by low threshold temperatures. Furthermore, all previously known ice nuclei required supercooling of the cloud. Solid carbon dioxide suffers from the disadvantage that it readily sublimates under atmospheric conditions. Furthermore, it is relatively insensitive since the number of ice particles produced per particle of solid carbon dioxide is relatively small. The general purpose of this invention is to provide a method for weather modification which embraces all the advantages of the prior art approaches and possesses none of the aforementioned disadvantages. To attain this, the present invention contemplates the use of seeding agents which have a high solubility in water and a large endothermic heat of solution in water. By an endothermic heat of solution is meant the absorption of heat on dissolution which results in cooling of the solution. Such a seeding agent is capable of acting both as a condensation nucleus and as an ice nucleus. Typical materials which have a high solubility in water coupled with a large endothermic heat of solution in water are potassium nitrate, potassium nitrite, ammonium nitrate, and urea. Laboratory and field experiments have shown finely divided, crystalline urea to be an effective seeding agent having a threshold temperature at least as high as silver iodide and being at least as potent as silver iodide.

It is an object of this invention to provide seeding agents for weather modification which have a high solubility in water and a large endothermic heat of solution in water.

Another object of this invention is to provide seeding agents which function both as condensation nuclei and a ice nuclei.

A further object of this invention is the provision of seeding agents which have a high threshold temperature and which do not require supercooling to be effective.

Still another object is to provide seeding agents which are inexpensive and readily available.

A still further object of this invention is the provision of seeding agents which are easily dispersed into the atmosphere and which are relatively unaffected by exposure to atmospheric conditions.

Laboratory experiments conducted in a Bigg-Warner chamber have shown urea to be highly effective ice nucleus with a threshold temperature as high as $+6°$ C. A Bigg-Warner chamber is essentially a closed chamber which is capable of being cooled to a controlled temperature and which has the necessary means for introducing water vapor and a seeding agent. Nucleation of the water vapor in the chamber is observed with the aid of a saturated sugar solution. A complete description of the construction and operation of a Bigg-Warner chamber similar to that used in these experiments, appears in "Elements of Cloud Physics" by Horace Robert Byers (University of Chicago Press).

In these experiments, the temperature of the Bigg-Warner chamber was first lowered to the desired temperatures and sufficient water vapor was then introduced into the chamber to produce an artificial cloud having a liquid water content of 2 to 3 grams per cubic meter. The urea used in these experiments was industrial grade obtained from a commercial source and which contained approximately 0.1 percent impurities including water. Before use, this urea was milled so that approximately $10^3$–$10^4$ particles were contained in 0.1 mg., the amount of urea used to seed in these experiments. Nucleation of the cloud in the chamber was considered to have been effected when one ice crystal was observed in the sugar solution.

These laboratory experiments indicated that urea generated ice particles from a temperature of $+6°$ C. to well below $-15°$ C. While an ice crystal which formed in a cloud with a temperature greater than $0°$ C. would, of course, immediately begin to melt, positive indication of cloud nucleation required only that it survive long enough to fall into the sugar solution. Preliminary tests disclosed that the sugar solution would not be affected by either urea particles or supercooled liquid droplets. Visual observation of the ice crystals in the cloud, which requires the existence of unobstructed crystalline faces, could be made at temperatures of $-8°$ C. and below. Above $-8°$ C., the crystal faces are obscured since both water and ice are formed together.

The seeding agents of the present invention operate both as condensation nuclei and as ice nuclei. At temperatures above and below the freezing point of water, they act as condensation nuclei since their high solubility in water renders them hygroscopic. As water is absorbed, cooling results because of the large endothermic heat of solution. As cooling progresses, a point is reached where an ice particle is formed which results in cloud nucleation in the conventional manner. For example, with urea, bulk aqueous solutions will be cooled to the eutectic point, $-11.5°$ C., and small aqueous droplets will be cooled to $-20°$ or $-25°$ C. Assuming that the maximum cooling obtainable is to the eutectic point, thermochemical calculations based on the solubility of urea and its heat of solution indicate that urea can nucleate a cloud with a temperature of $18°$ C.

To form an ice particle, the urea must cool the droplet to a temperature at which ice nucleation can take place. The freezing temperatures of urea solutions were determined by freezing solution droplets, 100 to 120 microns in diameter, suspended in silicone oil. Droplets of 0.83 and 6.8 molal urea solutions were observed to have median freezing temperatures of $-42°$ C. and $-48°$ C. In comparison, pure water droplets of a similar size have a median freezing temperature of $-36°$ C.

There is no evidence that urea solutions can cool themselves to below −40° C. While urea has a tetragonal crystal habit, it can, under the proper conditions, promote the growth of ice crystals by an epitaxial mechanism. Assuming +6° C. is the upper limit for ice nucleation by urea, it can be shown that the epitaxial threshold temperature is −20° C. As small quantities of saturated urea solutions have been observed to cool themselves to −20° to −25° C., the formation of ice crystals in a cloud seeded with urea can be explained on the basis of an epitaxial mechanism.

A series of field tests using urea as a seeding agent for supercooled clouds was carried out during midwinter in off-airways areas in the north-central United States. A specially instrumented airplane was used for releasing the urea and for monitoring the results. In three of the field experiments the urea was manually released by allowing it to flow out a 4 inch diameter plastic tube that was fitted into a hole in the fuselage of the airplane. Twenty pounds of urea were dropped in these field releases and the average seeding rate was between 5 and 10 pounds per mile. In the first and second field experiments, the urea used was similar to that used in the laboratory tests. Before use in the field experiments it was milled so as to have an average particle diameter of 25 to 30 microns, and each gram contained about $10^7$–$10^8$ particles. Wind tunnel tests indicated that clumping milled urea would not be a serious problem in air releases. In the third field experiment, the urea used was a reagent grade material obtained from a chemical supply house. This urea had an average particle diameter of 150 microns. In the fourth field test, industrial grade urea was released through a specially constructed pulverizing mechanism mounted on the aircraft.

In all tests, the urea was released in the upper 200 feet of the cloud. Previous experience indicated it to be advisable to use "Dry Ice" drops as an aid to navigation when testing unproven seeding agents. A "Dry Ice" drop was made in the first field experiment but was not used in subsequent tests because of the marked visual effects which accompany urea seeding.

In the first field experiment, the cloud seeded was of the stratus type. Its top was estimated to be 6.7 kilometers above the ground level, while its base was estimated to be 2.5 kilometers above the ground level. The liquid water content of this cloud was 0.5 grams per cubic meter, and its temperature was found to be −16° C. Urea was introduced into this cloud at a seeding rate of 9.3 pounds per mile. After a short period, a hole developed in the cloud with the appearance of sundogs and a heavy snow shower was observed to fall to the ground.

In the second experiment, a stratus cloud was again seeded. Its top and base were 6.0 and 3.3 kilometers above the ground level, respectively. Its temperature was −13.8° C., and its liquid water content was 0.6 grams per cubic meter. Urea was introduced into this cloud at a seeding rate of 4.8 pounds per mile, and a very dense snow shower and a broken hole in the cloud was observed after seeding.

In the third experiment, an altostratus cloud, with a top 10.8 kilometers above the ground level, was seeded. The base of this cloud was 9.8 kilometers above the ground level, and its temperature and liquid water content were observed to be −13.1° C. and 9.2 grams per cubic meter. Urea was added to this cloud at a rate of 12.2 pounds per mile and produced a well-defined snow shower that was strongly sheared by the wind below the cloud base.

In the fourth field experiment, a thick stratus cloud with a base approximately 0.9 kilometers above the ground level was seeded, and the temperature of this cloud was observed to be −10° C. Ten grams of urea were seeded into the cloud over a 2-mile flight path. About $10^{11}$ particles were produced by the pulverizer, and a definite snow shower was observed to fall from the cloud.

The seeding agents of the present invention have not only utility in themselves but are also useful when admixed with conventional seeding agents. For example, a mixture of potassium nitrate and cupric sulfide was observed in tests in a Bigg-Warner chamber to have a threshold temperature several degrees higher than that observed for cupric sulfide alone. The seeding agents of the present invention can be used in the form of mechanical mixtures with conventional seeding agents, but they can be more effectively used as an exterior coating on conventional seeding agents.

The present invention provides a method for weather modification using seeding agents characterized by high solubility in water and a large endothermic heat of solution in water. A typical example of a material suitable for use in this invention is urea. It is inexpensive, readily available, and highly effective and is capable of acting as both a condensation and ice nucleus. Obviously, many modifications and variations of the present invention are possible in the light of the above teachings. It is, therefore, understood that within the scope of the appended claims, the invention may be practiced otherwise than as specifically described.

I claim:

1. The method of producing precipitation from a natural atmospheric cloud comprised of supercooled water droplets, which method comprises introducing into said cloud particles of a finely divided solid substance having a high solubility in water and a large endothermic heat of solution and selected from the group consisting of urea, potassium nitrate, potassium nitrate and ammonium nitrate.

2. The method of claim 1 wherein the solid substance is urea.

3. The method of claim 1 wherein the solid substance is potassium nitrate.

4. The method of claim 1 wherein the solid substance comprises potassium nitrite.

5. The method of claim 1 wherein the solid substance comprises ammonium nitrate.

6. The method of causing ice crystal formation in a mass of water droplets having a temperature less than +6° C., which comprises introducing into said mass of particles a finely divided solid substance having a high solubility in water and a large endothermic heat of solution and selected from the group consisting of urea, potassium nitrate, potassium nitrite and ammonium nitrate.

7. The method of claim 6 wherein the solid substance is urea.

8. The method of claim 6 wherein the solid substance is potassium nitrate.

9. The method of claim 6 wherein the solid substance is potassium nitrite.

10. The method of claim 6 wherein the solid substance is ammonium nitrate.

11. The method of causing ice crystal formation in a mass comprised of supercooled water droplets, which method comprising introducing into sad mass an intimate mixture of finely divided solid substances, one of said solid substances consisting of a crystalline material capable of acting as an ice forming nucleus, an another of said solid substances consisting of a material having a high solubility in water and a large endothermic heat of solution in water.

12. The method of claim 11 wherein the material having a high solubility in water and a large endothermic heat of solution is urea.

13. The method of claim 11 wherein the material having a high solubility in water and a large endothermic heat of solution is potassium nitrate.

14. The method of claim 11 wherein the material having a high solubility in water and a large endothermic heat of solution is potassium nitrite.

15. The method of claim 11 wherein the material having a high solubility in water and a large endothermic heat of solution is ammonium nitrate.

16. The method of claim 12 wherein the urea forms a coating on the crystalline material capable of acting as an ice nucleus.

17. The method of causing ice crystal formation in a mass of water droplets suspended in air and having a temperature less than +6° C., which method comprises introducing in said mass particles of finely divided urea whereby the water droplets are simultaneously condensed on and cooled by the urea particles thereby causing crystallization of water in the aforementioned mass of water droplets.

18. The method of causing precipitation from a natural atmospheric cloud consisting of supercooled water droplets which comprises introducing into said cloud particles of a finely divided solid material foreign to said cloud having a high solubility in water and a large endothermic heat of solution in water and selected from the group consisting of urea potassium nitrate, potassium nitrite, and ammonium nitrate whereby the water droplets are simultaneously condensed and cooled by the said particles thereby causing crystallization of the water droplets in the aforementioned natural atmospheric cloud.